(12) United States Patent
Quintana Sanchez et al.

(10) Patent No.: US 11,595,121 B2
(45) Date of Patent: Feb. 28, 2023

(54) POINTING UNIT

(71) Applicant: Airbus Operations Limited, Bristol (GB)

(72) Inventors: Crisanto Quintana Sanchez, Bristol (GB); Gavin Erry, Bristol (GB); Yoann Thueux, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days.

(21) Appl. No.: 17/327,032

(22) Filed: May 21, 2021

(65) Prior Publication Data
US 2021/0409114 A1 Dec. 30, 2021

(30) Foreign Application Priority Data
Jun. 26, 2020 (GB) ...................................... 2009791

(51) Int. Cl.
| | | |
|---|---|---|
| H04B 10/11 | (2013.01) | |
| H04B 10/071 | (2013.01) | |
| H04B 10/112 | (2013.01) | |
| H01Q 5/22 | (2015.01) | |
| H04B 10/032 | (2013.01) | |

(52) U.S. Cl.
CPC ....... *H04B 10/071* (2013.01); *H04B 10/1121* (2013.01); *H01Q 5/22* (2015.01); *H04B 10/032* (2013.01); *H04B 10/11* (2013.01); *H04B 10/112* (2013.01)

(58) Field of Classification Search
CPC .............. H04B 10/071; H04B 10/1121; H04B 10/118; H04B 10/112; H04B 10/11; H04B 10/032; H01Q 1/44; H01Q 3/02; H01Q 5/22

USPC .................................................. 398/115–131
See application file for complete search history.

(56) References Cited

U.S. PATENT DOCUMENTS

| | | | | |
|---|---|---|---|---|
| 4,636,797 A | * | 1/1987 | Saffold ..................... | H01Q 5/45 343/781 CA |
| 5,119,232 A | * | 6/1992 | Daley ....................... | G02B 5/22 359/359 |
| 5,182,564 A | * | 1/1993 | Burkett ................. | F41G 7/2246 342/53 |
| 5,585,953 A | * | 12/1996 | Zavrel .................... | H04B 10/40 398/115 |

(Continued)

FOREIGN PATENT DOCUMENTS

EP 1 370 014 12/2003

OTHER PUBLICATIONS

Jeffrey R. Charles, et al., "Hybrid RF / Optical Communication Terminal with Spherical Primary Optics for Optical Reception", 2011 International Conference on Space Optical Systems and Applications (ICSOS), 2011, 9 pages.

*Primary Examiner* — Dibson J Sanchez
(74) *Attorney, Agent, or Firm* — Nixon & Vanderhye P.C.

(57) ABSTRACT

A pointing unit 102 is for use with a free space optical communications terminal 100 including an optical source 104. The pointing unit 102 includes a first portion 106 having a mirrored surface 108, the first portion 106 being orientatable relative to an optical beam 110 produced by the optical source 104 and incident on the mirrored surface 108 in use to direct a reflection 112 of the optical beam 110 from the mirrored surface 108 towards a target 107. The first portion 106 further includes a directional radio frequency antenna 114.

19 Claims, 4 Drawing Sheets

(56) References Cited

U.S. PATENT DOCUMENTS

| | | | | |
|---|---|---|---|---|
| 6,307,521 | B1* | 10/2001 | Schindler | H01Q 19/192 343/781 CA |
| 6,314,163 | B1* | 11/2001 | Acampora | H04B 10/25753 398/118 |
| 6,490,066 | B1* | 12/2002 | Korevaar | H04B 10/40 398/128 |
| 6,492,943 | B1* | 12/2002 | Marumoto | H01Q 3/385 342/372 |
| 6,788,898 | B1* | 9/2004 | Britz | H04B 10/1125 398/118 |
| 6,801,172 | B1* | 10/2004 | Schwengler | H01Q 5/45 343/781 R |
| 6,816,112 | B1* | 11/2004 | Chethik | H04B 10/118 342/359 |
| 7,336,902 | B1* | 2/2008 | Gerszberg | H04B 10/25752 398/115 |
| 7,394,988 | B1* | 7/2008 | Johnson | H04B 10/1125 398/115 |
| 7,453,835 | B1* | 11/2008 | Coty | H04W 92/02 398/115 |
| 8,019,224 | B2* | 9/2011 | Karaki | H04B 10/2575 398/115 |
| 8,094,081 | B1 | 1/2012 | Bruzzi et al. | |
| 8,942,562 | B2 | 1/2015 | Pusarla et al. | |
| 2002/0122230 | A1 | 9/2002 | Izadpanah et al. | |
| 2002/0146192 | A1* | 10/2002 | Tangonan | H01Q 15/0013 385/15 |
| 2003/0123882 | A1* | 7/2003 | Izadpanah | H04B 10/1121 398/131 |
| 2004/0037566 | A1* | 2/2004 | Willebrand | H04B 10/1123 398/115 |
| 2004/0062551 | A1* | 4/2004 | ElBatt | H04B 10/1121 398/115 |
| 2004/0146296 | A1* | 7/2004 | Gerszberg | H04B 10/1123 398/12 |
| 2006/0008274 | A1* | 1/2006 | Wilcken | H01Q 3/2676 398/115 |
| 2007/0031150 | A1 | 2/2007 | Fisher et al. | |
| 2007/0031151 | A1 | 2/2007 | Cunningham et al. | |
| 2007/0268188 | A1* | 11/2007 | Guha | H01Q 9/0407 343/700 MS |
| 2011/0262145 | A1* | 10/2011 | Ruggiero | H04B 10/2575 398/115 |
| 2012/0002973 | A1 | 1/2012 | Bruzzi et al. | |
| 2012/0068880 | A1 | 3/2012 | Kullstam et al. | |
| 2013/0129341 | A1* | 5/2013 | D'Errico | H04B 10/1123 398/5 |
| 2015/0098707 | A1 | 4/2015 | Pusarla et al. | |
| 2015/0357712 | A1* | 12/2015 | Griffith | H01Q 19/062 398/117 |
| 2015/0357713 | A1* | 12/2015 | Griffith | G02B 3/14 343/720 |
| 2019/0261262 | A1 | 8/2019 | Stiles et al. | |
| 2019/0288387 | A1* | 9/2019 | Wu | H01Q 3/02 |
| 2020/0373662 | A1* | 11/2020 | Gleason | G01S 17/88 |

* cited by examiner

FIG 9

POINTING UNIT

RELATED APPLICATION

This application claims priority to and incorporates by reference United Kingdom patent application GB 2009791.1 filed Jun. 26, 2020.

TECHNICAL BACKGROUND

The present disclosure relates to a pointing unit, and more specifically to a pointing unit for use with a free space optical communications terminal.

BACKGROUND

Free space optical (FSO) communications is an optical communications technique that uses light propagating in free space to wirelessly transmit data. In the context of FSO communications, 'free space' refers to, for example, air, space, vacuum, or similar and is in contrast with communications via solids such as a fiber-optic cable. FSO communications can be useful for example in cases where communication via physical connections, such as fiber-optic cables or other data cables, is impractical. One such case is, for example, communications between an aircraft such as a drone and a ground-based terminal.

FSO communications can offer higher data rates and improved security as compared to other wireless communication techniques. For example, FSO communications can achieve higher data rates, and can be less susceptible to jamming and interception, as compared to radio frequency (RF) communications. On the other hand, as compared to RF communications, FSO communication can be more dependent on a line of sight between transmitter and receiver and is more susceptible to changes in visibility, such as the presence of clouds.

SUMMARY

According to a first aspect of the present invention, there is provided a pointing unit for use with a free space optical communications terminal comprising an optical source, the pointing unit comprising a first portion comprising a mirrored surface, the first portion being orientatable relative to an optical beam produced by the optical source and incident on the mirrored surface in use to direct a reflection of the optical beam from the mirrored surface towards a target; wherein the first portion further comprises a directional radio frequency antenna.

Optionally, a normal of the mirrored surface and a beam direction of the directional radio frequency antenna are substantially co-linear.

Optionally, a or the normal of the mirrored surface is in an opposing direction to a or the beam direction of the directional radio frequency antenna.

Optionally, the mirrored surface is provided by a mirror, and the mirror and the directional radio frequency antenna are arranged back to back.

Optionally, the first portion comprises a support having a front part and a back part, the front part being on an opposite side of the support to the back part, and the mirrored surface is provided on the front part, and the directional radio frequency antenna is provided on the back part.

Optionally, a or the normal of the mirrored surface is in substantially the same direction as a or the beam direction of the directional radio frequency antenna.

Optionally, the directional radio frequency antenna is a patch antenna.

Optionally, a ground plane of the patch antenna is provided by the mirrored surface.

Optionally, the mirrored surface is provided by a surface of the directional radio frequency antenna.

Optionally, the directional radio frequency antenna comprises a phased array for adjusting a or the beam direction of the directional radio frequency antenna.

According to a second aspect of the present invention, there is provided a pointing system for use with a free space optical communications terminal, the pointing system comprising the pointing unit according to the first aspect, and a controller arranged to control the orientation of the first portion of the pointing unit.

Optionally, the controller is configured to switch between an optical mode in which the first portion is controlled to be orientated to direct the reflection of the optical beam incident on the mirrored surface in use from the mirrored surface towards a given target to allow for free space optical communications with the given target, and a radio frequency mode in which the first portion is controlled to be orientated to direct a beam of the directional radio frequency antenna towards the given target to allow for radio frequency communications with the given target.

Optionally, the controller is configured to monitor an optical link performance parameter associated with said free space optical communications in use; and to switch from the optical mode to the radio frequency mode when the optical link performance parameter falls below a predetermined threshold.

Optionally, in order to switch from the optical mode to the radio frequency mode, the controller is configured to: rotate in tilt by 135 degrees the first portion; or rotate in tilt by 45 degrees and rotate in pan by 180 degrees the first portion.

According to a third aspect of the present invention, there is provided a free space optical communications terminal comprising the pointing unit according to the first aspect or the pointing system according to the second aspect; and the optical source configured to produce the optical beam.

According to a fourth aspect of the present invention, there is provided a vehicle comprising the pointing unit according to the first aspect, or the pointing system according to the second aspect, or the free space optical communications terminal according to the third aspect.

Optionally, the vehicle is an aircraft and/or a spacecraft.

According to a fifth aspect of the present invention, there is provided a method of operating a pointing unit of a free space optical communications terminal comprising an optical source, the pointing unit comprising a first portion, the first portion comprising a mirrored surface and a directional radio frequency antenna, the method comprising: when an optical mode is selected, controlling the pointing unit to orientate the first portion relative to an optical beam produced by the optical source and incident on the mirrored surface to direct a reflection of the optical beam from the mirrored surface towards a target; and when a radio frequency mode is selected, controlling the pointing unit to orientate the first portion to direct a beam of the directional radio frequency antenna towards the target.

Optionally, the method comprises: determining an optical link performance parameter associated with the performance of communications with the target in the optical mode; and switching from the optical mode to the radio frequency mode when the optical link performance parameter falls below a predetermined threshold.

Optionally, the directional radio frequency antenna comprises a phased array, and the method comprises: when a radio frequency mode is selected, controlling the phased array to adjust a beam direction of the beam of the directional radio frequency antenna towards the target.

Further features and advantages of the invention will become apparent from the following description of preferred embodiments of the invention, given by way of example only, which is made with reference to the accompanying drawings. As used herein, like reference signs denote like features.

DETAILED DESCRIPTION

Figure 1:
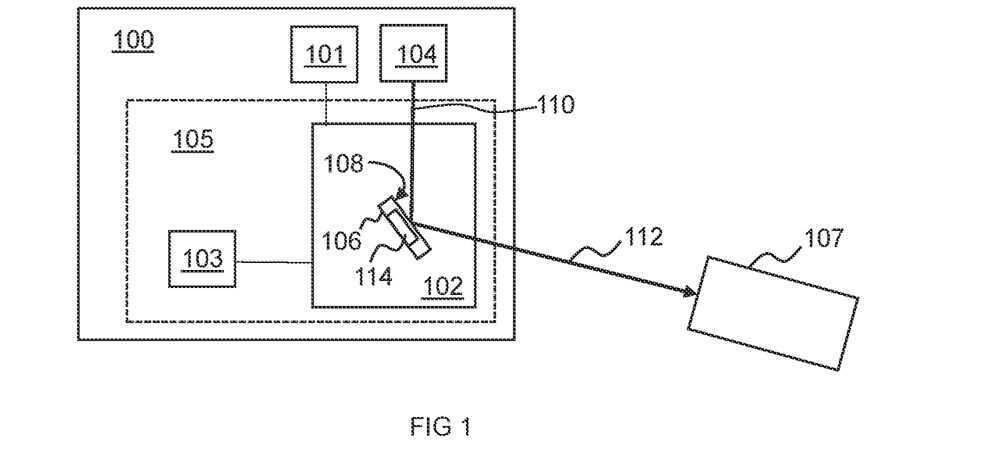
FIG. 1 is a schematic diagram illustrating a FSO communications terminal in communication with a target.

Referring to FIG. 1, an example free space optical (FSO) communications terminal 100 comprises an optical source 104, a radio frequency (re source 101, and a pointing system 105.

The optical source 104 is arranged to produce an optical beam 110. For example, the optical source 104 may comprise a laser and the optical beam 110 may be or comprise a laser beam 110. The optical source 104 is configured to encode data onto the optical beam 110. For example, the optical source 104 may be configured to modulate the optical beam 110 so as to encode bits of data therein. The data encoded onto the optical beam 110 may comprise information to be communicated to a target 107.

The RF source 101 is arranged to produce a radio frequency (RF) signal. For example, the RF source 101 may be configured to encode data onto the RF signal. The data encoded onto the RF signal may comprise information to be communicated to the target 107.

The pointing system 105 comprises a pointing unit 102 and a controller 103.

The pointing unit 102 has a first portion 106 that comprises both a mirrored surface 108 and a directional RF antenna 114. The first portion 106 is orientatable relative the optical beam 110 produced by the optical source 104 and incident on the mirrored surface 108 to direct a reflection 112 of the optical beam 110 from the mirrored surface 108 towards the target 107. The pointing unit 102 may be controlled by the controller 103 to orient the first portion 106 to direct the reflection 112 of the optical beam 110 from the mirrored surface 108 towards the target 107 (as shown in FIG. 1). As such, the pointing unit 102 is able to provide for FSO communications. The first portion 106 may be orientated to direct the directional RF antenna 114 and/or a directed RF signal emitted thereby towards the target 107. The pointing unit 102 may be controlled by the controller 103 to orient the first portion 106 to direct the RF signal produced by the RF source 101 and emitted by the directional RF antenna 114 towards the target 107. As such, the pointing unit 102 is able to provide for directed RF communications.

Providing both the mirrored surface 108 and the directional RF antenna 114 as part of the first portion 106 of the pointing unit 102 allows for FSO communications and for RF communications to be provided with lower weight and consuming less space, for example as compared to a system in which separate FSO and RF terminals are provided. Directed RF communications provided by the directional RF antenna 114 may achieve higher gain or signal strength (and therefore increased range or data rate) for given transmission power as compared to, for example, an omnidirectional antenna. Providing the directional antenna 114 as part of the orientatable first portion 106 of the pointing unit 102 of the FSO communications terminal 100 therefore allows for relatively low power RF communications to be provided, as well as the facility for FSO communications, in a space and weight efficient way. Accordingly, the pointing unit 102 provides for the facility of either or both FSO and RF communications while minimizing space weight and/or power. This may be useful, for example, for providing for the facility of either or both FSO and RF communications in vehicles, where the weight of, and space and power consumed by, components of a communication terminal are important considerations. This may be particularly useful, for example, in aircraft such as drones and/or spacecraft such as satellites, where space, weight and/or power (SWaP) of components is to be kept to a minimum, for example to enable the vehicles to operate effectively.

In some examples, the controller 103 may be configured to switch between an optical mode (as illustrated in FIG. 1) in which the first portion 106 is controlled to be orientated to direct the reflection 112 of the optical beam 110 incident on the mirrored surface 108 from the mirrored surface 108 towards the target 107 to allow for free space optical communications with the target 107, and a radio frequency mode in which the first portion 106 is controlled to be orientated to direct a beam of the directional radio frequency antenna 114 towards the target 107 to allow for radio frequency communications with the target 107. For example, the controller 103 may be configured to monitor an optical link performance parameter associated with the free space optical communications, and to switch from the optical mode to the radio frequency mode when the optical link performance parameter falls below a predetermined threshold. For example, the target 107 may monitor reception of the optical beam 112 and/or the data communicated thereon, and may determine based thereon an optical link performance parameter which may be sent to the FSO terminal for example via a reciprocal optical beam (not shown) sent from the target 107 to the FSO terminal 100 or by other means such as satellite. When the optical link performance parameter falls below a predetermined threshold, for example because of poor visibility or adverse weather or the like, the controller 103 may switch from the optical mode to the RF mode. The RF mode may therefore provide a reliable back-up to the optical mode.

In some examples, the FSO terminal 100 may receive or derive position information indicating a position of the target 107 relative to the FSO terminal 100, and the controller 103 may control the pointing unit 102 to direct the reflected optical beam 112 and/or the directed RF beam towards that position. For example, the position information may comprise Global Position System (GPS) coordinates of the target 107 comprising altitude, latitude and longitude information. The position information may also comprise GPS coordinates of the terminal 100. The position of the target 107, for example the GPS coordinates of the target 107, may be communicated to the FSO terminal 100 via satellite or other communications link (not shown). The position information may also comprise roll and pitch angles of the FSO terminal 100, for example derived via gyroscopes (not shown) of the FSO terminal 100.

The pointing unit 102 may be configured to direct the reflected optical beam 112 and/or RF beam over a relatively large solid angle. For example, the pointing unit 102 may be configured to orientate the mirrored surface and/or directional RF antenna over a 360 degree range of pan and/or tilt angle (i.e. azimuth and/or zenith).

In some examples, the pointing unit 102 may be a coarse pointing unit 102. The coarse pointing unit 102 may direct the reflected optical beam 112 and/or the RF beam towards the target 107 in a relatively coarse fashion, for example with a precision of a few tenths of a degree. The coarse pointing unit 102 may be a mechanical unit that is mechanically limited to a precision of a few tenths of a degree. The divergence of the RF beam emitted by the directional RF antenna 114 may be large compared to the divergence of the reflected optical beam 112. For example, the divergence of the RF beam may be around 40 degrees whereas the divergence of the reflected optical beam 112 may be 1 degree or less. As such the precision of the coarse pointing unit 102 may be more than enough to appropriately orientate the first portion 106 to direct the RF beam towards the target 107.

In some examples, the FSO terminal 100 may comprise a fine pointing unit (not shown) that is upstream of the coarse pointing unit 102 with respect to the optical beam 110. The fine pointing unit (not shown) may carry out alignment on the optical beam 110 to, for example, a thousandth of a degree. For example, the fine pointing unit (not shown) may comprise fast steering mirrors that move at a higher frequency and with more precision but over a relatively small angular range as compared to the mirrored surface 108 of the coarse pointing unit 108. For example, the fast steering mirrors may be actuatable over a 1 degree or less range of pan and/or tilt angle.

The directional RF antenna 114 may be, for example, a patch antenna, although other directional antennas such as a Yagi antenna may be used. A patch antenna may consume a relatively small amount of space, for example as compared to a Yagi antenna. The directional antenna 114 being a patch antenna may therefore help to reduce the space and/or weight of the FSO terminal 100. Alternatively or additionally, a patch antenna may have a relatively low profile, for example as compared to a Yagi antenna. The directional RF antenna 114 being a patch antenna may therefore help to reduce the rotational inertia of the first portion 106 which may in turn help to reduce the power required to actuate the pointing unit 106.

Figure 2A:
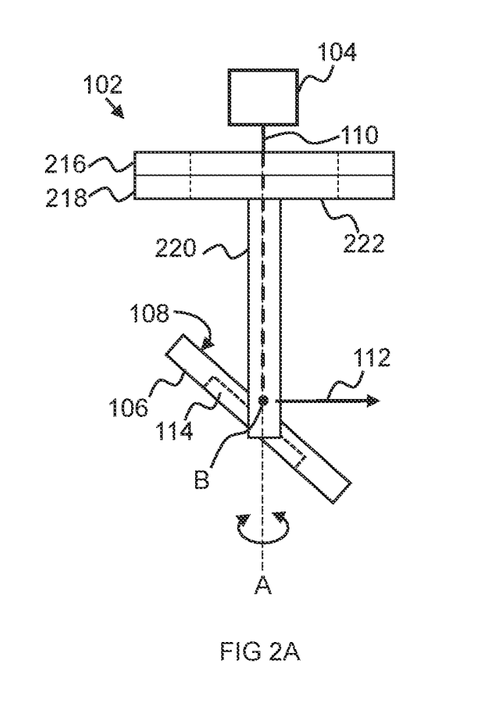
FIG. 2A is a schematic diagram illustrating a side view of a pointing unit according to an example.
Figure 2B:
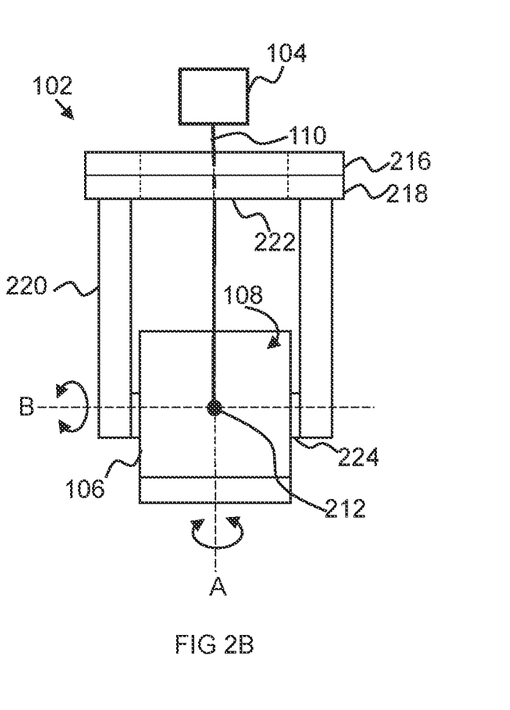
FIG. 2B is a schematic diagram illustrating a side view of the pointing unit of FIG. 2A but rotated through 90 degrees as compared to FIG. 2A.

FIGS. 2A and 2B illustrate a pointing unit 102 according to an example. The pointing unit 102 of FIGS. 2A and 2B may be used, for example, as the pointing unit 102 of the FSO terminal 100 described with reference to FIG. 1.

Referring to FIGS. 2A and 2B, the example pointing unit 102 comprises a first portion 106. The first portion 106 comprises a mirrored surface 108 and a directional radio frequency antenna 114. The first portion 106 is orientatable relative to an optical beam 110 produced by the optical source 104 and incident on the mirrored surface 108 to direct a reflection 112 of the optical beam 110 from the mirrored surface towards a target (not shown in FIGS. 2A, 2B). The first portion 106 is also orientatable to direct the directional RF antenna 114 and/or a directed RF beam emitted thereby towards the target.

In this example the first portion 106 is rotatably mounted to support bars 220 via an axel 224. The first portion 106 is rotatable 360 degrees about a first axis B defined by the axel 224. The first axis B may lie in the plane of the mirrored surface 108. The support bars 220 are connected to a first platform part 218. The first platform part 218 is rotatably mounted to a second platform part 216. The second platform part 216 may be fixed to the terminal 100, i.e. fixed relative to the optical source 104. The first platform part 218 and the second platform part 218 together define an aperture 222 through which the optical beam 104 can pass from the optical source 104 to the mirrored surface 108. The first platform part 218 (and hence the support bars 220 and the first portion 106) is rotatable 360 degrees about a second axis A perpendicular to the first axis. Accordingly, by rotation about the first axis B and/or the second axis A, the first portion 106 is orientatable over a 360 degree range of pan and/or tilt angle (i.e. azimuth and/or zenith), e.g. relative to the optical beam 110.

The pointing unit 102 may comprise motors or other actuators (not shown) arranged to cause rotation of the first platform part 218 relative to the second platform part 216 about the second axis A and rotation of the first portion 106 relative to the support bars 220 about the first axis B. The controller 103 (not shown in FIGS. 2A and 2B) may be arranged to control the orientation of the first portion 106 via coordinated control of those motors or actuators, thereby to control the orientation of the first portion relative to the optical beam 110.

FIGS. 3 to 7 illustrate different examples of a first portion 306-706 that may be used as the first portion 106 of the example pointing units 102 described above with reference to FIGS. 1 to 2B.

In some examples, a normal 328 of the mirrored surface 108 and a beam direction 326 of the directional RF antenna 114 may be substantially co-linear (see e.g. the example first portions 306-606 of FIGS. 3 to 6, respectively). The normal 328 of the mirrored surface 108 and a beam direction 326 of the directional RF antenna 114 being substantially co-linear may help provide that a spatial footprint of the first portion 306-606 is minimized, for example as compared to an arrangement in which the mirrored surface and the RF antenna are side-by-side.

Figure 3:
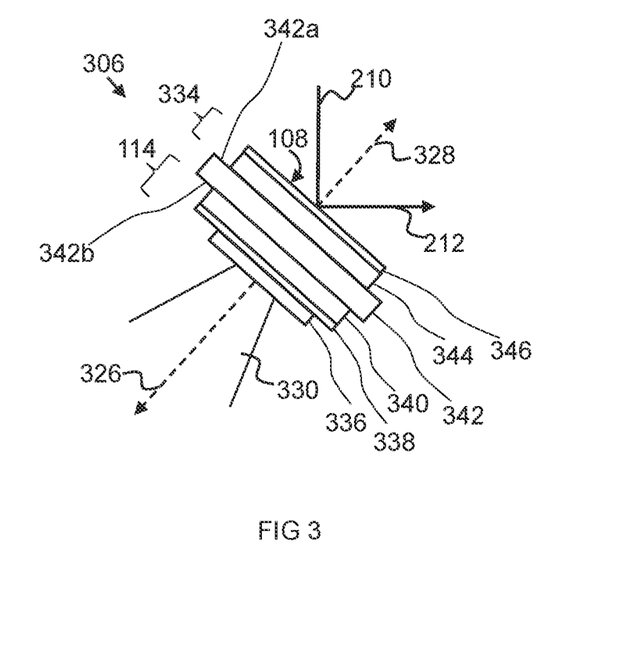
FIG. 3 is a schematic diagram illustrating a side view of first portion of a pointing unit according to a first example.
Figure 4:
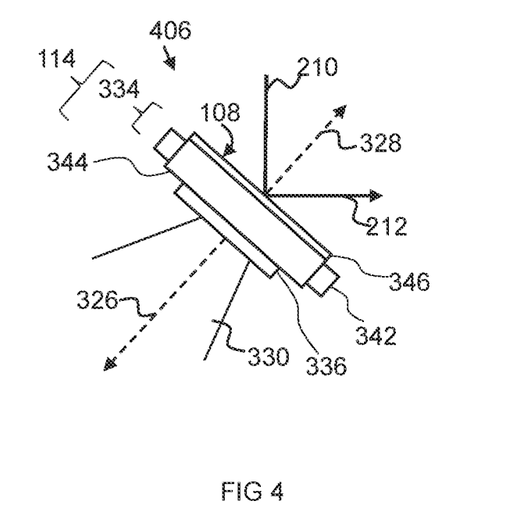
FIG. 4 is a schematic diagram illustrating a side view of first portion of a pointing unit according to a second example.
Figure 5:
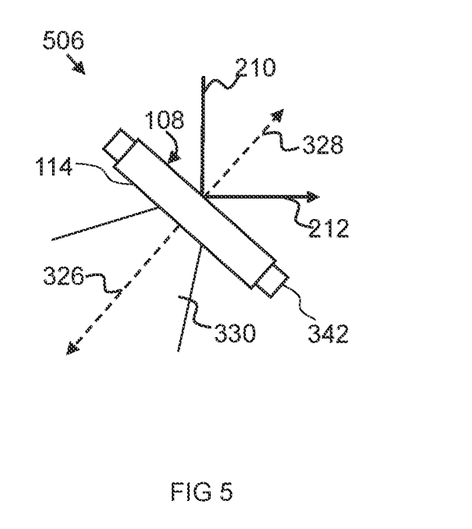
FIG. 5 is a schematic diagram illustrating a side view of first portion of a pointing unit according to a third example.

In some examples, the normal 328 of the mirrored surface 108 may be in an opposing direction to the beam direction 326 of the directional radio frequency antenna 114 (see e.g. the first portions 306-506 illustrated in FIGS. 3 to 5, respectively). The normal 328 of the mirrored surface 108 being in an opposing direction to the beam direction 326 of the directional radio frequency antenna 114 may help provide a simple arrangement and/or for minimal interference between the FSO communications and RF communications. In these examples, the controller 103 may switch between the optical mode and the RF mode by controlling the pointing unit 102 to rotate the first portion (e.g. in tilt and/or in tilt and pan) to direct one or the other of the reflected beam 112 and the RF beam towards the target. As an example, it may be assumed that, in use, the reflected beam 212 typically makes an angle with the normal 328 of the mirrored surface 108 of 45 degrees, for example +/−5 or 10 degrees. A simple and fast way to switch from the optical mode and the RF mode may therefore be to rotate in tilt by 135 degrees the first portion 306-506; or alternatively rotate in tilt by 45 degrees and rotate in pan by 180 degrees the first portion 306-506. This may allow the directional RF antenna 114 and/or RF beam emitted thereby to be directed, +/−5 or 10 degrees, towards the target 117. Bearing in mind the relatively large divergence of the RF beam (e.g. 40 degrees) relative to the optical beam 212 (e.g. 1 degree or less), this may allow the directional RF antenna 114 and/or the RF beam emitted thereby to be sufficiently directed towards the target, in a fast and simple manner. In other examples, the orientation of the first portion 106 needed to direct the RF beam towards the target 107 may be calculated, and switching to the RF mode may comprise controlling the pointing unit 102 may to orientate the first portion 106 according to the calculation. This alternative may provide more precise directing of the RF beam to the target 107.

Figure 6:
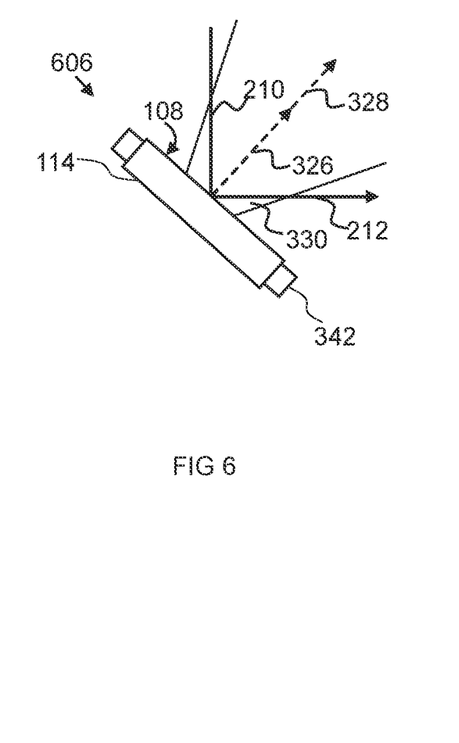
FIG. 6 is a schematic diagram illustrating a side view of first portion of a pointing unit according to a fourth example.
Figure 7:
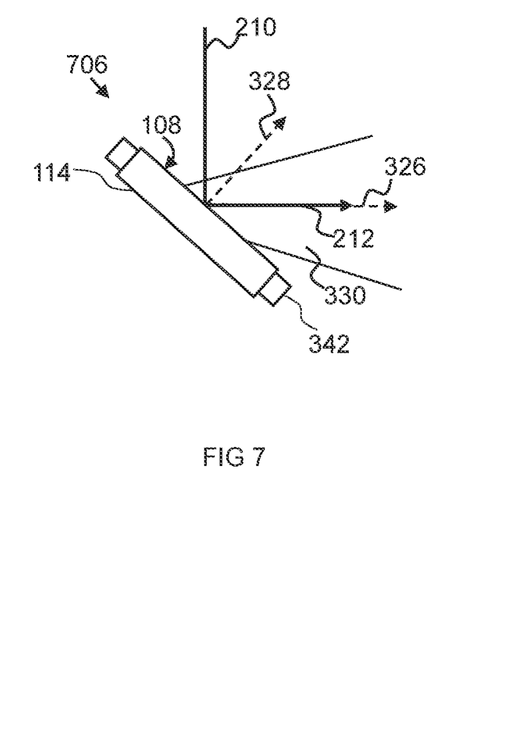
FIG. 7 is a schematic diagram illustrating a side view of first portion of a pointing unit according to a fifth example.

In some examples, the normal 328 of the mirrored surface 108 may be in substantially the same direction as the beam direction 326 of the directional radio frequency antenna 114 (see e.g. the first portions 606-706 illustrated in FIGS. 6 to 7, respectively). This may reduce or negate the need to re-orientate the first portion 606-706 in order to change between the optical mode and the RF mode. This in turn may allow for faster and/or more economical switching between the optical mode and the RF mode. Alternatively or additionally, this may in turn allow for simultaneous functioning of the optical mode and the RF mode, which may provide for improved communication flexibility.

In some examples, the mirrored surface 108 may be provided by a surface of the directional radio frequency antenna 114 (see e.g. the first portions 506-706 illustrated in FIGS. 5 to 7, respectively). For example, the mirrored surface 108 may be provided by a polished surface, such as a polished metallic surface, of the radio frequency antenna 114. For example, where the directional RF antenna 114 is provided by a patch antenna 114, the mirrored surface 118 may be provided by a polished surface of a ground plane or a polished surface of a patch of the patch antenna 114. Providing the mirrored surface 108 as a surface of the directional RF antenna 114 may allow for the mirrored surface 108 and the directional RF antenna 114 to be provided as a single component, which may in turn allow for a reduction in the weight of the first portion 506-706 and/or space consumed by the first portion 506-706. Alternatively or additionally, this may provide a simple arrangement to provide that the normal 328 of the mirrored surface 108 be in substantially the same direction as the beam direction 326 of the directional radio frequency antenna 114 (see e.g. the first portions 606-706 illustrated in FIGS. 6 to 7, respectively), which may in turn allow the advantages associated therewith stated above.

In some examples, the RF directional antenna 114 may be or comprise a phased array (see e.g. the first portion 706 of FIG. 7). A phased array may comprise an array of antennas, for example an array of patch antennas, which together create an RF beam that can be electronically steered to point in different directions without moving the antennas. The phased array may be controllable e.g. by the controller 103, to adjust the beam direction of the beam of the directional radio frequency antenna towards the target. A phased array may be used in any of the examples described herein to provide for adjustment of the RF beam direction on top of or in addition to the directing resulting from orientation of the first portion 106-706 of the pointing unit 102. This may provide for more precise directing of the RF beam towards the target 107. For example, in examples where the normal 328 of the mirrored surface 108 faces in substantially the same direction as the RF beam emitted by the RF antenna 114, the phased array may be controlled to adjust the direction of the RF beam 326 to be co-linear with the reflected optical beam 212 (see e.g. FIG. 7). This may provide for both the RF beam 326 and the reflected optical beam 212 to be precisely directed to the target 107. This may allow for switching between the optical mode and the RF mode without necessitating any change in the orientation of the first portion 706, which may in turn allow for fast and efficient switching. Alternatively or additionally, this may allow for the optical mode and the RF mode to be provided simultaneously in a precise way, which may allow for improved data rates and/or communication flexibility.

Referring now to the example first portion 306 illustrated in FIG. 3, the first portion 306 comprises a mirror 334, a directional RF antenna 114, and a support 342.

In this example, the mirrored surface 108 is provided by the mirror 334. The mirror 334 comprises a substrate layer 344 and a reflective layer 346. The reflective layer 346 may comprise metal such as gold, aluminum or silver to provide the mirrored surface 108. The mirrored surface 108 has a surface normal 328. The mirrored surface 108 reflects an optical beam 210 from an optical source of an FSO terminal (not shown in FIG. 3). An angle made between the incident optical beam 210 and the normal 328 is the same as the angle made between the normal 328 and the reflected optical beam 212. In use, this angle is typically around 45 degrees+/−5 or 10 degrees.

In this example, the RF antenna 114 is provided by a patch antenna 114. The patch antenna 114 comprises a patch 336 and a ground plane 340 separated by a dielectric layer 338. For example, the patch 336 and the ground plane 340 may each be provided by a metal sheet. The ground plane 340 is larger than the patch 336. The ground plane 340 acts to reflect the radio waves emitted by the patch 336. The patch antenna 114 emits an RF beam 330. The RF beam 330 is emitted in a certain direction 326. As mentioned above, the RF beam 330 may have a relatively large divergence, for example 40 degrees.

The support 342 of the first portion 306 may be connected to the remainder of the pointing unit 102, for example the axle 224 of the pointing unit 102 of FIGS. 2A and 2B. The support 342 supports the mirror 334 and the RF antenna 114. The mirror 334 and the directional RF antenna 114 are arranged back to back. That is, a back part of the RF antenna 114 faces a back part of the mirror 334. Providing the mirrored surface 108 as part of a mirror 224, and arranging the mirror 224 and the RF antenna 114 back to back may provide a simple, for example relatively low cost and low complexity, arrangement, that is space efficient.

In this example, the support 342 has a front part 342a and a back part 342b, the front part 342a being on an opposite side of the support 342 to the back part 342b, and the mirror 334 is provided on the front part 342a, and the directional radio frequency antenna 114 is provided on the back part 342b. Providing the RF antenna 114 on a back part 342b of mirror support 342 may allow for the dual-function (i.e. RF and optical) pointing unit to be provided with minimal alteration to a FSO communications terminal coarse pointing unit, which in turn may allow for a cost effective arrangement.

Referring now to the example first portion 406 illustrated in FIG. 4, the first portion 406 comprises a mirror 334, a directional RF antenna 114, and a support 342.

Similarly to the first portion 306 described with reference to FIG. 3, in the example first portion 406 illustrated in FIG. 4, the mirror 334 comprises a substrate layer 334 and a reflective metal layer 346 such as gold, aluminum or silver to provide the mirrored surface 108; the support 342 supports the RF antenna 114 and the mirror 334; and the RF antenna 114 is a patch antenna 114 comprising a patch 336. However, in the example first portion 406 illustrated in FIG. 4, the ground plane 346 of the patch antenna 114 is provided by the mirrored surface 108, i.e. the ground plane 346 of the patch antenna 114 is provided by the reflective metal layer 346 of the mirror 334. In this example, the substrate layer 334 of the mirror 334 is a dielectric layer between the patch 336 and the reflective metal layer 346. In this example, the mirror 334, in effect, forms part of the directional RF antenna 114. This may reduce or negate the need to provide a separate ground plane for the patch antenna 114, which may in turn reduce the weight of the first portion 406 and/or the space consumed by the first portion 406.

Referring now to the example first portion 506 illustrated in FIG. 5, the first portion 506 comprises a directional RF antenna 114, and a support 342.

Similarly to the first portions 306-406 described with reference to FIGS. 3 and 4, in the example first portion 506 of FIG. 5, the support 342 supports the RF antenna 114; and the normal 328 of the mirrored surface 108 is in an opposing direction to the direction 326 of the RF beam 330 emitted by the directional RF antenna 114. However, in the example first portion 506 illustrated in FIG. 5, the mirrored surface 108 is provided by a surface of the RF antenna 114. For example, the mirrored surface 108 may be provided by a polished surface, such as a polished metallic surface, of the radio frequency antenna 114. For example, in the case that the RF antenna 114 is provided by a patch antenna 114, the mirrored surface may be provided by a polished ground plane of the patch antenna. The mirrored surface 108 being provided by a surface of the directional RF antenna 114 may allow for the mirrored surface 108 and the directional RF antenna 114 to be provided as by a single component (i.e. without a separate mirror), which may in turn allow for a reduction in the weight of the first portion 506 and/or space consumed by the first portion 506.

Referring now to the example first portion 606 illustrated in FIG. 6, the first portion 606 comprises a directional RF antenna 114, and a support 342.

Similarly to the first portion 506 described with reference to 5, in the example first portion 606 of FIG. 6, the support 342 supports the RF antenna 114; and the mirrored surface 108 is provided by a surface of the RF antenna 114. However, in the example first portion 606 illustrated in FIG. 6, the normal 328 of the mirrored surface 108 is in substantially the same direction as the direction 326 of the RF beam 330 emitted by the directional RF antenna 114. The mirrored surface 108 may be provided by a polished surface, such as a polished metallic surface, of the radio frequency antenna 114. For example, in the case that the RF antenna 114 is provided by a patch antenna, the mirrored surface may be provided by a polished patch of the patch antenna. This may provide a simple arrangement to provide that the normal 328 of the mirrored surface 108 be in substantially the same direction as the beam direction 326 of the directional radio frequency antenna 114. This, in turn, may reduce or negate the need to re-orientate the first portion 606 in order to change between the optical mode and the RF mode. This in turn may allow for faster and/or more economical switching between the optical mode and the RF mode. Alternatively or additionally, this may allow for simultaneous functioning of the optical mode and the RF mode, which may provide for improved communication flexibility.

Referring now to the example first portion 706 illustrated in FIG. 7, the first portion 706 comprises a directional RF antenna 114, and a support 342.

Similarly to the first portion 606 described with reference to 6, in the example first portion 706 of FIG. 7, the support 342 supports the RF antenna 114; the mirrored surface 108 is provided by a surface of the RF antenna 114; and the normal 328 of the mirrored surface 108 points in a similar direction (e.g. in a common hemisphere) as the direction 326 of the RF beam 330 emitted by the directional RF antenna 114. However, in the example first portion 706 of FIG. 7, the directional RF antenna 114 is or comprises a phased array 114. The phased array may comprise an array of antennas (not shown), for example an array of patch antennas (not shown), which together create an RF beam 330 that can be electronically steered to point in a desired direction 326. In these examples, the mirrored surface 108 may be provided by, for example, an array of patches of patch antennas. The phased array 114 may be controllable e.g. by the controller 103 (not shown in FIG. 7), to adjust the RF beam direction 326 to be directed towards the target (not shown in FIG. 7). The phased array 114 may be controlled to adjust the direction of the RF beam 326 to be co-linear with the reflected optical beam 212. This may provide for both the RF beam 326 and the reflected optical beam 212 to be precisely directed to the target 107. This may allow for switching between the optical mode and the RF mode without necessitating any change in the orientation of the first portion 706, which may in turn allow for fast and efficient switching. Alternatively or additionally, this may allow for the optical mode and the RF mode to be provided simultaneously in a precise way, which may allow for improved data rates and/or communication flexibility.

Figure 8:
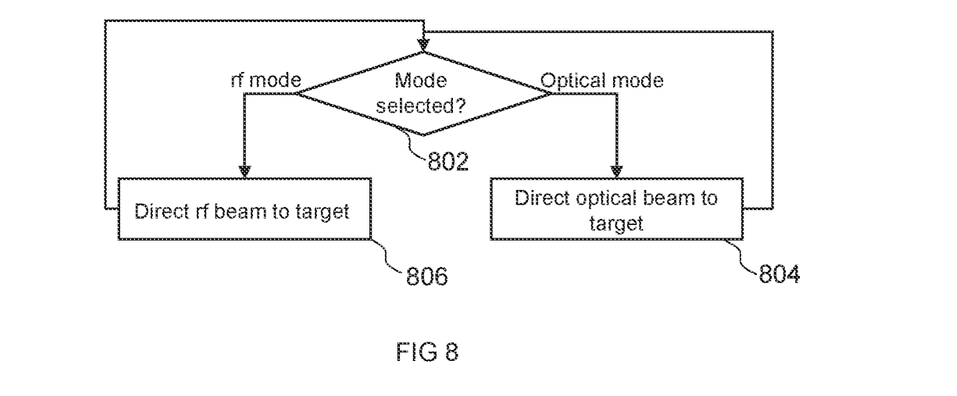
FIG. 8 is a flow diagram illustrating a method according to an example.

Referring to FIG. 8, there is illustrated a flow diagram representing an example method of operating a pointing unit of a free space optical communications terminal comprising an optical source. The pointing unit comprises a first portion, the first portion comprising a mirrored surface and a directional radio frequency antenna. The pointing unit, the first portion, and/or the free space optical communications terminal may be any one of those described in the above examples with reference to FIGS. 1 to 7. In some examples, the method may be performed by the controller 103 of the FSO communications terminal 100.

The method comprises, in step 802, selecting one or both of an optical mode and an RF mode. When the optical mode is selected, the method comprises, in step 804, controlling the pointing unit 102 to orientate the first portion 106 relative to an optical beam 110 produced by the optical source 104 and incident on the mirrored surface 108 to direct a reflection 112 of the optical beam 110 from the mirrored surface 108 towards a target 107. When the radio frequency mode is selected, the method comprises, in step 806, controlling the pointing unit 102 to orientate the first portion 106 to direct a radio frequency beam 330 emitted by the directional radio frequency antenna 114 towards the target.

In some examples, in step 802, one or the other of the RF mode and the optical mode may be selected. For example, this may be performed for a pointing unit 102 of any of the examples described herein. However, in other examples, in step 802, either one or both of the RF mode and the optical mode may be selected. For example, this may be performed for a pointing unit 102 having a first portion where the RF beam 326 and the reflected optical beam 212 can be pointed in a similar or the same direction at the same time (for example as per the example first portions 606-706 described above with reference to FIGS. 6 and 7).

In some examples, the mode selection may be reviewed periodically or continuously to determine which mode (or modes) is to be selected.

In some examples, a default mode may be the optical mode, and the RF mode may be selected when optical communications in the optical mode is not possible or is of poor quality, such as experiencing a low data rate or high loss rate. For example, the method may comprise monitoring an optical link performance parameter associated with the free space optical communications in the optical mode and switching the selection from the optical mode to the radio frequency mode when the optical link performance parameter falls below a predetermined threshold. For example, a target may monitor reception of the optical beam provided in the optical mode and/or the data communicated thereon and may determine based thereon an optical link performance parameter. The method may comprise receiving the optical link performance parameter from the target, for example via a reciprocal optical beam sent from the target 107 by other means such as satellite. When the optical link performance parameter falls below a predetermined threshold, for example because of poor visibility or adverse weather or the like, the selection may switch from the optical mode to the RF mode. The RF mode may therefore provide a reliable back-up to the optical mode. In some examples the selected mode may be switched from the RF mode to the optical mode. For example, the selected mode may be switched from the RF mode to the optical mode after a predetermined time period, for example to test if optical communications in the optical mode would be suitable, or for example on receipt of a signal indicating that conditions for optical communications have improved.

In some examples, the directional radio frequency antenna 114 comprises a phased array (see e.g. the example first portion 706 of FIG. 7), and the method may further comprise, when the radio frequency mode is selected, controlling the phased array 114 to adjust a beam direction 326 of the beam of the directional radio frequency antenna 114 towards the target 107. This may provide for more precise directing of the RF beam towards the target 107.

Figure 9:
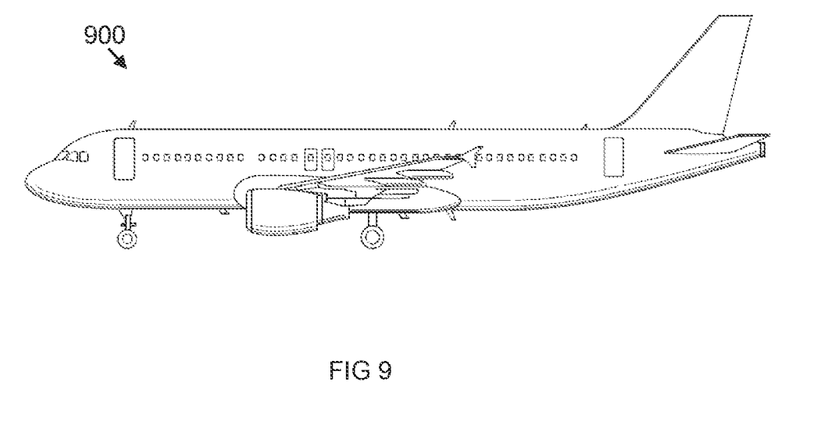
FIG. 9 is a schematic diagram illustrating a vehicle according to an example.

In some examples, a vehicle may be provided with the pointing unit 102, the pointing system 105, and/or the FSO communications terminal 100 as per any of the examples described above with reference to FIGS. 1 to 8. For example, the FSO communications terminal 100 may be mounted to an exterior of the vehicle. In some examples, the vehicle may be an aircraft, such as an airplane or a drone or a high-altitude aircraft. The vehicle may alternatively or additionally be a spacecraft, such as a satellite. FIG. 9 illustrates an example vehicle, in this case an aircraft 900, with which the example FSO terminals described herein (not shown in FIG. 9) may be used. Providing a vehicle/aircraft/spacecraft with the FSO terminal 100 may allow the vehicle/aircraft/spacecraft to communicate with other vehicles/aircraft/spacecraft and/or ground based units, for example via optical communications and/or RF communications. For example, a network of aircraft/spacecraft may be deployed to provide FSO communications and/or RF communications over a wide area. The reduced space, weight and/or power provided by examples of the FSO terminal 100 described herein may be of particular importance in aircraft and spacecraft, particularly in light weight and/or small aircraft/spacecraft such as drones and/or satellites, where space weight and power budgets are limited.

Where methods have been described above, they can be implemented wholly in software, wholly in hardware (such as by an application specific integrated circuit) or any combination of software and hardware. For example, the software and/or hardware may be implemented on the controller 103 of the pointing system 105. A software implementation may comprise computer-readable medium comprising instructions that instruct a processor (e.g. a processor of the controller 103) to carry out the method. The computer-readable medium may be a non-transitory computer readable medium.

It is to be noted that the term "or" as used herein is to be interpreted to mean "and/or", unless expressly stated otherwise.

Although the example first portions 306-706 described above with reference to FIGS. 3 to 7 each comprised a support 342, it will be appreciated that this need not necessarily be the case and that in some examples the first portion 306-706 may not comprise a support and, for example, instead the mirror 334 and/or directional RF antenna 114 may be connected directly to other parts of a pointing unit, for example directly to the axle 224 of the pointing unit 102 described with reference to FIGS. 2A and 2B.

The above examples are to be understood as illustrative examples of the invention. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention, which is defined in the accompanying claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A pointing unit configured for a free space optical communications terminal including an optical source, the pointing unit comprising:
   a first portion including a mirrored surface and a directional radio frequency antenna,
   wherein the first portion is orientatable relative to an optical beam produced by the optical source and incident on the mirrored surface to direct a reflection of the optical beam from the mirrored surface towards a target,
   wherein a normal of the mirrored surface is co-linear to a beam direction of the directional radio frequency antenna, and wherein the normal of the mirrored surface is in an opposing direction to the beam direction of the directional radio frequency antenna.

2. The pointing unit according to claim 1, wherein the mirrored surface is provided by a mirror, wherein the mirror and the directional radio frequency antenna are back to back.

3. The pointing unit according to claim 1, wherein the first portion comprises a support having a front part and a back part, the front part being on an opposite side of the support to the back part, wherein the mirrored surface is on the front part, and the directional radio frequency antenna is on the back part.

4. The pointing unit according to claim 1, wherein a normal of the mirrored surface is aligned with a beam direction of the directional radio frequency antenna.

5. The pointing unit according to claim 1, wherein the directional radio frequency antenna is a patch antenna.

6. The pointing unit according to claim 5, wherein a ground plane of the patch antenna is the mirrored surface.

7. The pointing unit according to claim 1, wherein the mirrored surface is a surface of the directional radio frequency antenna.

8. The pointing unit according to claim 1, wherein the directional radio frequency antenna comprises a phased array configured to adjust the beam direction of the directional radio frequency antenna.

9. A pointing system for use with a free space optical communications terminal, the pointing system comprising:
the pointing unit according to claim 1, and
a controller configured to control an orientation of the first portion of the pointing unit.

10. The pointing system according to claim 9, wherein the controller is configured to switch between an optical mode in which the first portion is controlled to be orientated to direct the reflection of the optical beam incident on the mirrored surface from the mirrored surface towards the target, and a radio frequency mode in which the first portion is controlled to be orientated to direct the beam of the directional radio frequency antenna towards the target.

11. The pointing system according to claim 10, wherein the controller is configured to monitor an optical link performance parameter, and to switch from the optical mode to the radio frequency mode in response to the controller determining that the optical link performance parameter is below a predetermined threshold.

12. A free space optical communications terminal comprising:
the pointing unit according to claim 1; and
the optical source is configured to produce the optical beam.

13. A vehicle comprising the pointing unit according to claim 1.

14. The vehicle according to claim 13, wherein the vehicle is an aerospace craft.

15. The pointing unit of claim 1 wherein the mirrored surface is planar.

16. A pointing system for use with a free space optical communications terminal, the pointing system comprising:
a pointing unit configured for a free space optical communications terminal including an optical source, the pointing unit includes a first portion including a mirrored surface and a directional radio frequency antenna, wherein the first portion is orientatable relative to an optical beam produced by the optical source and incident on the mirrored surface to direct a reflection of the optical beam from the mirrored surface towards a target, and
a controller configured to control an orientation of the first portion of the pointing unit,
wherein the controller is configured to switch between an optical mode in which the first portion is controlled to be orientated to direct the reflection of the optical beam incident on the mirrored surface from the mirrored surface towards the target, and a radio frequency mode in which the first portion is controlled to be orientated to direct the beam of the directional radio frequency antenna towards the target, and
wherein, to switch from the optical mode to the radio frequency mode, the controller is configured to rotate the first portion by at least one of: in tilt by up to 135 degrees and in tilt by up to 45 degrees.

17. A method of operating a pointing unit of a free space optical communications terminal comprising an optical source, the pointing unit comprising a first portion, and the first portion comprising a mirrored surface and a directional radio frequency antenna, the method comprising:
when an optical mode of the pointing unit is selected, controlling the pointing unit to orientate the first portion relative to an optical beam produced by the optical source and incident on the mirrored surface to direct a reflection of the optical beam from the mirrored surface towards a target; and
when a radio frequency mode of the pointing unit is selected, controlling the pointing unit to orientate the first portion to direct a beam from the directional radio frequency antenna towards the target,
wherein a normal of the mirrored surface is always co-linear to a beam direction of the directional radio frequency antenna, and
wherein the normal of the mirrored surface is in an opposing direction to the beam direction from the directional radio frequency antenna.

18. The method according to claim 17, wherein the method further comprises:
determining an optical link performance parameter associated with performance of communications between the fee space optical communications terminal and the target while the pointing unit is in the optical mode; and
switching from the optical mode to the radio frequency mode when the optical link performance parameter falls below a predetermined threshold.

19. The method according to claim 17, wherein the directional radio frequency antenna comprises a phased array, and wherein the method further comprises:
when the radio frequency mode is selected, controlling the phased array to adjust the beam direction of the beam of the directional radio frequency antenna towards the target.

* * * * *